ated June 18, 1974

United States Patent [19]
Seebald

[11] 3,817,194
[45] June 18, 1974

[54] PORTABLE UTILITY DEVICE FOR FLUID PROCESSING OF DELETERIOUS MATERIAL

[76] Inventor: Francis Warren Seebald, 18801 E. Shoreland Dr., Rocky River, Ohio 44116

[22] Filed: July 10, 1972

[21] Appl. No.: 270,318

Related U.S. Application Data
[63] Continuation-in-part of Ser. No. 869,598, Oct. 27, 1969.

[52] U.S. Cl.................................. 111/7.1, 172/379
[51] Int. Cl............................................ A01c 23/02
[58] Field of Search........................... 111/6, 7.1–8; 47/1

[56] References Cited
UNITED STATES PATENTS

| | | | |
|---|---|---|---|
| 1,979,541 | 11/1934 | Gunn | 111/7.1 |
| 2,222,235 | 11/1940 | Nelson | 111/7.3 |
| 2,237,447 | 4/1941 | Rea | 111/7.3 |
| 2,530,886 | 11/1950 | Maisel | 111/8 X |
| 2,619,055 | 11/1952 | Abel et al. | 111/7.1 |
| 2,638,730 | 5/1953 | Davidson | 111/7.1 UX |
| 2,821,048 | 1/1958 | Efford et al. | 111/7.3 X |
| 3,680,504 | 8/1972 | Seebald | 111/6 |

*Primary Examiner*—Robert E. Bagwill
*Attorney, Agent, or Firm*—Teare, Teare & Sammon

[57] ABSTRACT

A portable utility device for fluid processing of deleterious material disposed on the ground and including an elongated, tubular frame defining a fluid receiving chamber. A handle is mounted at one end for manipulating the device and a spray assembly including a spray head is mounted at the opposite end for spraying fluid from the chamber. A selectively actuatable valve assembly is mounted on the body being connected to a source of pressurized fluid for controlling the flow of fluid through the spray assembly. A shredding assembly is mounted on the body including a shredder for shredding deleterious material, and the shredder is spaced outwardly from and aligned with the spray head being disposed in the path of the spraying fluid for dissolving the deleterious material and cleaning the shredder when the device is in use.

10 Claims, 5 Drawing Figures

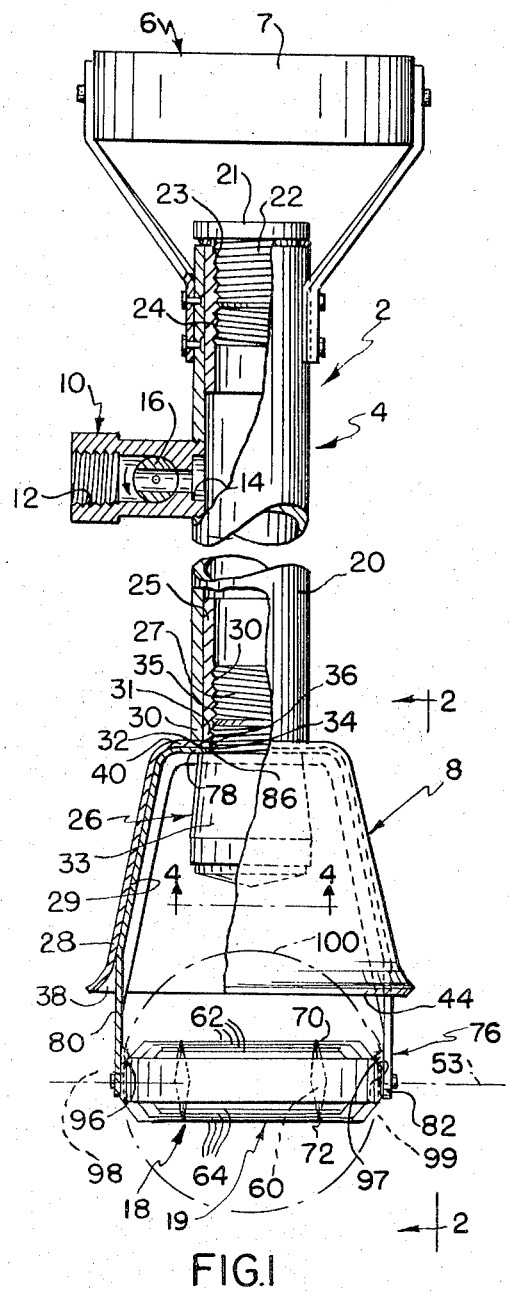

PORTABLE UTILITY DEVICE FOR FLUID PROCESSING OF DELETERIOUS MATERIAL

CROSS-REFERENCE TO PRIOR APPLICATIONS

The present application is a continuation-in-part of patent application Ser. No. 869,598 filed Oct. 27, 1969.

BACKGROUND OF THE INVENTION

The present invention is related generally to devices or tools which may be used for landscaping residential, commercial and/or industrial areas, such as yards, lawns or the like. More particularly, the present invention relates to an improved multi-purpose device of a portable type which is constructed for processing and fluid treating deleterious material which is disposed on or about the landscaped area.

The present invention constitutes an improvement over the agricultural implement disclosed in the aforementioned U.S. patent application, Ser. No. 869,598, which was designed and constructed for aerating and fertilizing of soil. More particularly, the agricultural device of the present invention is designed for processing and treating of deleterious material, such as animal refuse, or the like, so as to facilitate the effective disposal and treatment thereof. The problem with respect to the disposal of said such deleterious material has become particularly acute in recent years due to the increasing numbers of domestic animals which are being kept as pets within large metropolitan areas. Previously, the disposal of such deleterious material has been extremely combersome and obnoxious. The present device is so constructed as to facilitate the disposal of such material in a more efficient and pleasant manner.

SUMMARY OF THE INVENTION

The present invention contemplates providing an improved utility device for the processing of deleterious material disposed on the ground for disposing of such material in a facile and non-obnoxious manner. More particularly, the device comprises an elongated frame in a form of a hollow tubular body which defines a fluid receiving chamber. A handle is mounted adjacent one end of the frame for grasping by an operator for manipulation of the device. A spray assembly is mounted adjacent the opposite end of the frame, being connected in fluid communication with the fluid chamber for discharging fluid therefrom. A selectively actuatable valve assembly is mounted on the body which is adapted for connection at one end to a source of pressurized fluid and is connected at another end in fluid communication with the fluid chamber, being adapted for controlling the flow of fluid through the spray assembly. The spray assembly includes a spray head for directing fluid outwardly from the opposite end of the body. A shredding assembly is mounted on the body adjacent the spray assembly being adapted for shredding and breaking up the deleterious material for further processing by spraying contact with the fluid. The shredding assembly includes a porous shredder which is spaced outwardly from and aligned with the spray head so as to be disposed in the path of the spraying fluid such that the deleterious material is dissolved, and the shredder is cleaned during use of the device. The spray assembly further includes a splashguard which surrounds the spray head and opens outwardly away from the body so as to confine the spray to a predetermined area on the ground. The shredder includes cutting means, which in one form, comprise a plurality of blades for cutting through the deleterious material, and which are spaced apart from one another so as to enable the spraying liquid to pass therebetween. More particularly, the shredder comprises a cutting grid which includes a generally circular support frame, and the blades extend transversely of the support frame. The shredder is pivotally mounted on the body in spaced, generally axially aligned relation with respect to the spray head such that the spray will contact the cutter blades. The blades are of a double edge construction so that one edge can be positioned for cutting into the deleterious material, while another edge is positioned for cleaning by the spraying liquid. Still further, the body comprises a hollow cylindrical tube which is open at its opposite ends and having a cap member mounted at the end adjacent the handle portion to enable access to the interior of the body such that, when desired, a chemical substance may be introduced into the interior of the body for mixing with the fluid therein, and subsequently discharged with the spraying liquid for treating the deleterious material. A locking means is provided which coacts with the shredder to secure the one edge in position for cutting while the other edge is positioned for cleaning by the spray.

As can be seen, the utility device of the present invention is of an extremely simple, yet rugged construction which can be easily manipulated by an operator. Further, the device provides an extremely facile, effective and relatively pleasant means of disposing of such deleterious material. Still further, the device of the present invention is constructed such that it can be cleaned during use thereof in a manner which is considerably less obnoxious and unpleasant as compared to formerly known devices.

BRIEF DESCRIPTION OF THE DRAWINGS

FIG. 1 is a fragmentary, partially in section elevation view of the utility device of the present invention;

FIG. 2 is a fragmentary, elevation view taken along the line 2—2 of FIG. 1;

FIG. 3 is a transverse sectional view taken along the line 3—3 of FIG. 2;

FIG. 4 is a fragmentary, transverse view taken along the line 4—4 of FIG. 1.

DESCRIPTION OF THE PREFERRED EMBODIMENTS

Figure 5:
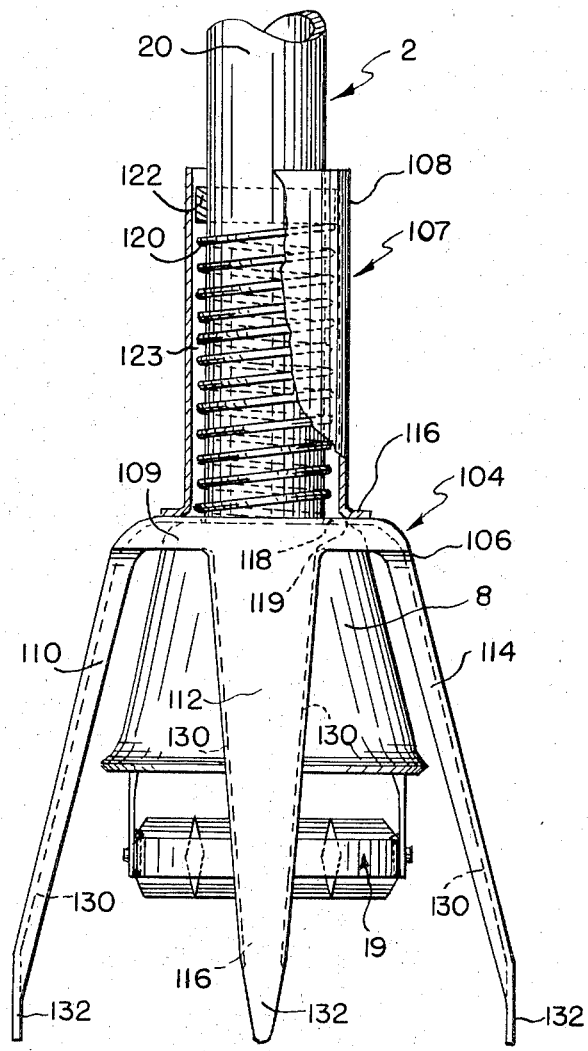
FIG. 5 is another form of the utility device of the present invention.

Referring now again to FIG. 1, the utility device of the present invention is shown generally at 2 as including a body 4 having a handle 6 mounted at one end, such as the upper end, and a spray assembly 8 mounted at the opposite end, such as the lower end. A selectively actuatable valve assembly 10 is mounted on the body which includes an inlet end 12 adapted for connection to a source of pressurized fluid, such as a conventional home waterline or the like, and an outlet end 14 which is connected in fluid communication with the interior of the body 4. A valve member 16 is mounted between the inlet end 12 and outlet end 14 for selectively controlling the flow of the water into and through the body 4 for discharge through the spray assemblh 8. A shredder assembly 18 is mounted on the body 4 at the end remote from the handle 6 and is aligned with the spray assembly 8 such that the spray issuing from the spray assembly 8 will be directed onto the shredder assembly. In the form shown, the shredder assembly includes a shredder member 19 for cutting into the deleterious material, and preferably, such cutting is accomplished simultaneously during spraying of fluid onto the shreadder member 19 so that the latter is cleaned simultaneously during use of the device.

Referring again to FIG. 1, the body 4 comprises an elongated, hollow tube 20 which is opened adjacent its opposite ends being adapted at one end, such as the lower end, for connection in fluid communication with the spray assembly 8 and at its other end is adapted to receive a closure cap 21 to enable access to the interior of the tube 20. For example, it may be desired to mix a chemical substance with the fluid flowing through the tube, and thus, either a granulated or solid tablet material may be inserted into the tube through its upper end, when desired. In the form shown, a pair of cylindrical sleeves 24 and 25 are mounted within and adjacent to the opposed open ends of the tube and may be secured thereto, such as by welding or the like, so as to form an integral part of the tube 20. The cap 21 is shown as including a threaded shank 22 for threaded connection with the sleeve 24, as at 23.

The spray assembly 8 is shown as including a spray head 26 and a splash guard 28. The spray head 26 may be of any conventional construction, and in the form shown, include a shank 27 which extends inwardly into the sleeve 25 adjacent the lower end of the tube 20. The shank 27 may be threaded, such as at 35, being adapted for threaded connection with corresponding threads 30 on the interior surface of the sleeve 25. Further, the lower marginal edge 30 of the tube 20, and lower marginal edge 31 of the inner sleeve 25 terminate adjacent to one another and together define an annular shoulder 32 adapted for seated engagement with the splash guard 28 in a manner to be described more fully hereinafter. THe spray head 26 is further shown as including a bulbous head portion 33 which includes an annular shoulder 34 which overlaps the shoulder 32, and which extends generally radially outwardly adjacent the shank 27 and coacts with the shoulder 32 for clampingly engaging the splash guard 28. The head portion 33 includes a face 34 at the end remote from the shank 27 which includes a plurality of spaced apertures 36 for discharging the water from the tube 20 in the form of a spray. The apertures 36 may be arranged in any suitable manner so as to direct the spray generally axially in the lengthwise direction of the tube 20. The apertures 36 should be of a diameter sufficient to restrict the flow of water through the head portion 33 to produce jet-like streams, as well known in the art, for contact with the shredder assembly 18 and the deleterious material to be treated.

Referring to FIGS. 1 and 2, the splash guard 28 is shown in the form of a hollow bell-shaped shell being generally frusto-conical in side elevation (FIG. 2). As shown, the splashguard includes an annular flange 40 which extends radially inwardly defining an opening 36 at one end for receiving the shank 27 of the spray head 26 therethrough, and another opening 38 at the opposite end to enable the fluid to pass outwardly from the spray head 26 onto the shredder assembly 18. As shown, the splash guard 28 surrounds the spray head 26 being disposed generally axially and concentrically with respect thereto. The interior wall 29 of the splashguard is inclined generally outwardly in a direction from its upper end adjacent the opening 36 toward its opposite end adjacent the opening 38. In the form shown, the minimum diameter of the shoulder 32 of the head portion 33 and the shoulder 34 of the tube 20 is greater than the maximum diameter of the opening 36 such that when the shank 27 of the spray head 26 is inserted through the opening 36 and threadably connected within the sleeve 25, the shoulders 32 and 34 will clampingly engage the flange 40 and hold the splash guard 28 adjacent the lower end of the tube 20. As shown, the splash guard 28 extends in its lengthwise direction outwardly from the tube 20 beyond the lower end of the head portion 33 having a lower marginal edge 44 which is disposed downwardly and outwardly from the head portion 33, and which defines a plane which extends generally transversely of the lengthwise axis of the tube 20.

Referring now to FIG. 3, the shredder member 19 in the form shown, comprises a frame 52 which may be generally circular in top plan as shown in FIG. 3. The frame 52 may be mounted for pivotal movement about a pivotal axis 53 and supports a blade assembly 54. In the form shown, the blade assembly 54 includes one set of blades 57 including the blades, such as at 58, which extend in one direction and another set of blades 59, including the blades 60, which may extend generally transversely, such as perpendicular, to the blades 58. As shown, the blades 58 of the set 57 extend in generally parallel, spaced relation to one another and the blades 59 of the set 60 extend in generally parallel, spaced relation to one another defining a plurality of openings 36 therebetween.

Referring now to FIGS. 1 and 2, the blades 58 and 59 are shown as being generally diamond-shaped when viewed in end elevation. As shown in FIG. 2, each of the blades 58 which form the set 57 includes an upper edge 62 and a lower edge 64 which extend generally parallel to one another. As shown in FIG. 2, the respective blades 58 may be equally spaced from one another with each being relatively wider, such as indicated by the dimensions A, than the adjacent blade such that the generally diametrically extending blades having the longest chordal distance are relatively wider than the blades having a lesser chordal distance. In the form shown, the blades 58 are arranged in pairs with one member of each pair being disposed on opposite sides of the center of the frame 52 in equally spaced relation from the pivoted axis 53. For example, the blades 58 and 58a of one set are of approximately the same width and spaced an equal distance such as the distance B, on opposite sides of the pivotal axis 53, whereas, the blades of the adjacent pair of blades, such as 58b and 58c, are also approximately the same width and spaced an equal distance, such as the distance C, on opposite sides of the pivotal axis 53.

Referring now again to FIG. 1, each of the blades 60 of the set 59 are shown as having generally arcuately-shaped upper and lower edges 70 and 72, respectively, which progressively reduce in width from their center adjacent the pivotal axis 53 in a direction toward their opposite ends adjacent the frame 52 such that the upper edges 70 and lower edges 72 of the blades 60 intersect the upper edges 62 and lower edges 64 of the blades 58 respectively. It is understood that the blades 58 of the set 57 could have the same width and the blades 60 forming the other set could have linearly extending cutting edges 70 and 72 and have the same width A as the blades 58 and still not depart from the purpose and intent of the present invention except that in the arrangement shown, a rocking action can be imparted to the shredder member 19 resulting in a wider cut through the deleterious material leaving a space on opposite sides of the respective blades for greater churning action by the spraying fluid on the deleterious material.

As previously stated, the blades 58 and 60 are generally diamond-shape in end elevation and include upper deflecting surfaces 71 and 73 which extend outwardly in a direction away from the upper edges 62 and 70, respectively, and lower deflecting surfaces 75 and 77 which extend outwardly in a direction away from the lower edges 64 and 72 respectively. Such an arrangement exposes at least the upper half of each of the blades to a more direct impingement thereon by the spray for more effective cleaning thereof.

As shown in FIGS. 2 and 3, the frame 52 is mounted on the body 4 by an attachment bracket 76. The bracket 76 is shown as being of a generally inverted U-shaped configuration which conforms generally to the interior contour of the splashguard and includes a bight portion 78 which interconnects a pair of spaced generally laterally and downwardly depending arms 80 and 82. In the form shown, the bight portion 78 has a maximum width greater than the maximum diameter of the shank 27 of the spray head 26 and includes an opening 86 therein for receiving the shank 27 therethrough. The opening 86 has a maximum diameter less than the minimum diameter of the shoulder 34 such that when the spray head 26 is threadably connected within the tube 20, the shoulder 34 will clampingly engage the bight portion 78 of the bracket 76, along with the splashguard 8, and secure the bracket 76 in the assembled position. As shown in FIG. 3, the frame 52 is connected adjacent the lower end of the arms 80 and 82 on opposite sides thereof, such as by axially aligned pins 88 and 90. The pins 88 and 90 extend through openings 92 and 94 in the arms 80 and 82, respectively, and are loosely fitted therein to enable rotation of the support ring 52 about the pivotal axis 53 of the pins 88 and 90. Each of the arms 80 and 82 are shown as having an inwardly projecting detent element, such as at 96 and 97, respectively, which are adapted for snap action engagement with inwardly inclined surfaces 98 and 99 on the frame 52 to retard pivotal movement of the frame 52, when in position, and for positioning the frame 52 in generally axial alignment with the lengthwise axis of the tube 20 such that the general plane of the frame 52 extends generally perpendicularly to the lengthwise axis of the tube 20. In the form shown, the frame 52 has a maximum transverse dimension which is less than the minimum diameter of the splashguard adjacent the lower marginal edge 44 and the pivotal axis 53 of the pins 88 and 90 is spaced downwardly below the marginal edge 44 a distance less than the radius of the support ring 52 to provide clearance between the splashguard 8 and the frame 52 when the latter is pivoted as indicated by the phantom lines at 100 (FIG. 1) and at 102 (FIG. 2). As can be seen, by this arrangement, when the spray leaves the spray head 26, it is directed downwardly onto the shredder 19. The fluid spray will contact the blades, such as 58 and 60, and clean the confronting edges thereof. The fluid will then flow through the openings 56 between the respective blades into contact with the deleterious material being processed providing a churning and eroding action thereon. Simultaneously, the operator can further break the material up by manipulating the device in a generally vertical direction so as to cause the blades 58 and 60 to chop or cut the deleterious material. The combination of the eroding and shredding action will eventually work the deleterious material into the surrounding ground material. Then, the operator can rotate the shredder such that the edge of the blades, such as 64 and 72, used for the cutting operation will be rotated to the upper position for washing contact by the spray and the blades formerly in the upper position are moved to the lowered position to perform the shredding operation.

Although the device 2 is shown in a form including a pivotally mounted shredder 19 which includes double-edged blades such as 58 or 60, it is to be understood that the shredder 19 could be rigidly mounted on the body 4 and the blades, such as 58 and 60, could have only a single edge and still not depart from the intent of the present invention.

In the form of the invention illustrated in FIG. 5, the devide 2 is shown equipped with a stand 104 which serves to support the device 2 in an upright position in spaced relation from the ground and for movement into an out of engagement with the ground.

More specifically, the stand 104 is shown as being a multi-pod construction which may be made out of any suitable material, such as metal, plastic or the like. In the form shown, the stand 104 includes a base 106 on which there is supported a resilient restraining assembly 107. The form shows the base 106 includes a generally planar web section 109 from which there depends a plurality of legs 110, 112 and 114 (one leg 116 is hidden behind the leg 112) which are adapted for engagement with the ground. In the form shown, the base 106 is made of a relatively thin sheet material which may be turned in along its peripheral edges adjacent the legs 110, 112, 114 and 116 so as to define inwardly projecting and lengthwise extending ribs 130 for strengthening the legs along their lengthwise dimension. The ribs 130 are shown terminating short of the lower ends of the respective legs, and the legs are tapered in a direction toward their lower ends so as to define sharp tips, such as at 132, adapted to penetrate the ground, when desired.

The restraining means 107 is shown as including a support sleeve 108 which is mounted on the base 106 and is adapted to receive the tube 20 in telescoping relation therethrough. A resilient element, such as a coil spring 120, is mounted interiorily of the sleeve 108 in encircling relation about the tube 20 being adapted to bias the device 2 to a raised position above the ground when the legs, such as 110, are in engagement with the ground and to enable the shredder 19 to be moved downwardly into engagement with the ground.

In the form shown, the sleeve 108 includes an annular flange 116 adjacent its lower end for seated engagement with the web section 109. As shown, the flange 116 extends generally radially outwardly from the sleeve 108 and may be secured to the web section 109 in any suitable manner, such as by fusing, welding, adhesives or the like. The web section 109 is shown as including a generally centrally located opening 118 which defines a radially inwardly extending flange 119. The opening 118 may be circular in configuration having a diameter greater than the diameter of the tube 20, being adapted to receive the tube 20 therethrough. As shown, the sleeve 108 is spaced outwardly from the tube 20 in the installed position of the latter having a minimum transverse dimension adjacent the flange 116 which is greater than the minimum transverse dimension of the opening 118 such that the flange 116 overlies and is seated on the web section 109.

The coil spring 120 is shown disposed within the space between the tube 20 and the sleeve 108 and is biased at one end, such as its lower end, by the flange 119 of the web section 109 and at its opposite or upper end by an annular collar 122 which extends radially outwardly from the tube 20 and may be secured thereto, such as by welding or the like. As shown, the collar 122 is spaced upwardly from the lower end of the tube 20 and is disposed within the space 123 between the sleeve 108 and the tube 20 when the spring 120 is in the extended condition. Further, the collar 122 may be disposed adjacent the upper end of the sleeve 108 in the fully extended condition of the spring and may have a maximum thickness slightly less than the minimum transverse width of the space 123 so as to enable the collar to slide freely through the sleeve 108 while still confining the spring 120 within the space 123. In addition, the flange 40 of the splashguard 8 extends radially outwardly from the central axis of the tube 20 a distance greater than the radius of the opening 118 so that the spring 120 will urge the device 2 upwardly causing the flange 40 to seatingly engage the confronting underside of the flange 119 of the web section 109 for limiting the upward movement of the device 2. As can be seen, by this arrangement, the device 2 can be retained in an upright position with the shredder 19 supported in spaced relation above the ground by the stand 104. When desired, the operator merely forces the tube 20 generally axially downwardly through the sleeve 108 against the force of the spring 120 to cause the shredder 19 to engage the ground and any deleterious material which is disposed on the ground. The operator may continue to rapidly reciprocate the device 2 with respect to the stand 104 until the deleterious material is sufficiently worked into the ground by the combined shredding action of the shredder 19 and eroding action of the spraying fluid.

I claim:

1. A portable utility device for fluid processing of deleterious material disposed on the ground, comprising, an elongated frame, said frame comprising a hollow, tubular body defining a fluid receiving chamber, a handle mounted on one end of said frame for grasping by an operator for manipulating said device, a shredding assembly mounted on said body at the end opposite from said handle for shredding said deleterious material, a spray assembly mounted on said body at said opposite end being disposed in fluid communication with said fluid chamber for discharging fluid therefrom, said spray assembly includes a spray head having apertures therein arranged for directing fluid outwardly from said opposite end in the longitudinal direction of said body for spraying said fluid onto the ground when said device is in use, said shredding assembly includes a shredder member and a pair of laterally-extending support arms mounted on said frame for supporting said shredder thereon, said support arms extend outwardly from and in longitudinal direction of said frame having their distal ends spaced apart and disposed outwardly beyond said spray head, said shredder member is disposed between and connected to said support arms being connected at said distal ends in aligned relation to said spray head so as to be disposed in the path of the fluid being sprayed from said spray head, said shredder member comprises a grid including a plurality of cutting members having cutting edges extending generally transversely to the longitudinal direction of said body for cutting through said deleterious material, and said cutting members are supported in spaced relation from one another defining openings in said grid to enable fluid to pass between said cutting members for eroding said deleterious material and for cleaning said deleterious material from said grid when said device is in use.

2. A device in accordance with claim 1, wherein said body includes an inlet opening at one end adjacent said handle to enable access to the interior of said body for inserting a chemical substance therein.

3. A device in accordance with claim 1, wherein a selectively actuatable valve assembly is mounted on said body for connection to a source of pressurized fluid, and said valve assembly is connected in fluid communication with said fluid chamber for controlling the flow of fluid through said spray assembly.

4. A device in accordance with claim 1, including a stand for supporting said body on the ground in a generally upright position so as to have its longitudinal axis extending in a generally vertical direction, said body being mounted for movement relative to said stand and in its longitudinal direction for moving said shredder member between a raised position above the ground and a lowered position in engagement with the ground, said stand includes resilient means for urging said body upwardly and said shredder member toward said raised position above the ground and compressible to enable selective movement of said body member downwardly and said shredder member into said lowered position in engagement with said ground and the deleterious material thereon.

5. A device in accordance with claim 4, wherein said stand is of a pod-like construction including a plurality of spaced, vertically-extending legs for engagement with the ground, a web section interconnects said legs and includes an opening between said legs, said body is disposed in said opening for movement therein, said body includes an outwardly projecting abutment thereon, and said resilient member comprises a coil spring disposed around said body and has one end disposed in abutting engagement with said tower, and the other end disposed for abutting engagement with said web section for urging said body upwardly and said shredder member toward said raised position.

6. A device in accordance with claim 1, wherein
said cutting members comprise flat blades,
said blades of a double-edge construction including oppositely disposed cutting edges, and
said shredder member is pivotally mounted on said support arms for selectively positioning one cutting edge toward the ground for cutting into said deleterious material while said other edge is positioned toward said spray head for cleaning by said spray.

7. A device in accordance with claim 6, wherein
said shredder member includes a support frame for supporting said blades thereon,
said blades extend transversely of said support frame being disposed in generally parallel relation each having opposed distal ends connected to said support frame, and
the blades disposed closest to the diameter of the support frame have a width greater than the blades disposed farther away from the diameter of the support frame.

8. A device in accordance with claim 1, wherein
said shredder assembly includes positioning means for rotating said shredder member, said cutting edges extend generally transversely to the longitudinal axis of said body, and
said positioning means comprises oppositely disposed resilient elements mounted on said support arms for deformable engagement with said shredder member to retard pivotal movement thereof.

9. A portable utility device for fluid processing of deleterious material disposed on the ground, comprising, an elongated frame,
said frame comprising a hollow, tubular body defining a fluid receiving chamber,
a handle mounted on one end of said frame for grasping by an operator for manipulating said device,
a shredder assembly on said body at the end opposite from said handle for shredding said deleterious material,
a spray assembly mounted on said body at said opposite ends being disposed in fluid communication with said fluid chamber for discharging fluid therefrom,
said spray assembly includes a spray head having apertures therein arranged for directing fluid outwardly from said opposite end in the longitudinal direction of said body for spraying said fluid onto the ground when said device is in use,
said shredding assembly includes a shredder member having cutting means disposed on opposite sides thereof,
support arm means on said body, and
said shredder member is pivotally mounted on said support arm means in spaced, axially-aligned relation from said spray head so as to be disposed in the path of the fluid being sprayed therefrom,
said cutting means comprises a plurality of cutting members disposed in spaced relation from one another defining openings therebetween for the passage of spraying fluid therethrough, and
said shredder member is pivotally mounted on said support arm means to enable selective positioning of one side of said shredder member toward the ground for cutting through said deleterious material while the opposite side of said shredder member is positioned toward said spray head to enable the spraying fluid to contact and pass through the shredder member for cleaning said shredder member and eroding said deleterious material when said device is in use.

10. A device in accordance with claim 1 wherein,
said spray assembly includes a hollow splashguard mounted on said body at said opposite end for confining said spray to a predetermined area on the ground, and
said splashguard extends outwardly from and laterally alongside said spray head, being open at one end to allow said fluid spray to pass therethrough into contact with said grid and onto said deleterious material on the ground.

* * * * *